Patented Jan. 9, 1951

2,537,579

UNITED STATES PATENT OFFICE 2,537,579

STABILIZATION OF 3,4-DIHYDRO-1,2-PYRAN-2-CARBOXALDEHYDE

Eugene B. Fountain and Walter H. Sharp, Berkeley, Calif., assignors to Shell Development Company, San Francisco, Calif., a corporation of Delaware No Drawing. Application August 9, 1949, Serial No. 109,424

16 Claims. (Cl. 260—333)

This invention relates to a method of stabilizing 3,4-dihydro-1,2-pyran-2-carboxaldehyde to make possible its storage over prolonged periods of time, in the presence or absence of light, and to minimize the deleterious changes otherwise occurring therein under normal and usual conditions of transportation and storage. The invention relates particularly to the stabilization of 3,4-dihydro-1,2-pyran-2-carboxaldehyde to prevent spontaneous changes thereof with time, particularly in the nature of decreases with time as during storage, of the carbonyl content and the titre of the olefinic bond and to prevent or to minimize formation of water-insoluble polymer. The invention also relates to the stabilized compositions of matter resulting from the application of the method of the invention.

The compound 3,4-dihydro-1,2-pyran-2-carboxaldehyde, which can be produced by dimerization of acrolein and may be referred to as acrolein dimer, is a heterocyclic unsaturated aldehyde having a structure that may be represented by the formula

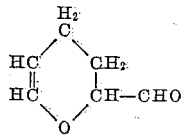

When freshly prepared it is a clear water-white mobile liquid having a refractive index of about 1.463 to 1.466 and a boiling point of about 88° C. under 100 millimeters' mercury pressure and about 146° C. under 760 millimeters' mercury pressure. Because of its particular chemical structure it is an unusually versatile chemical intermediate which can be employed for the preparation of a wide variety of chemical compounds that are useful in diverse fields.

When this heterocyclic aldehyde is stored in a sealed transparent container, such as a clear glass container, in a location open to light, it is converted in a relatively short time, usually within not more than about a month, to a viscous liquid, and eventually to a polymeric solid. The autopolymerization of 3,4-dihydro-1,2-pyran-2-carboxaldehyde appears to proceed by at least two separable types of change. The autopolymerization appears to be caused in part by the action of light and possibly by the action of peroxides, or both. Evidence for this conclusion is obtained from the fact that the autopolymerization of 3,4-dihydro-1,2-pyran-2-carboxaldehyde can be retarded either by adding thereto an effective amount (generally from about 0.005% to about 5% by weight) of a phenolic antioxidant, that is, a mono-, di-, or trihydric phenol, such as hydroquinone, benzoquinone, naphthoquinone, hydroquinone monomethyl ether, pyrogallol, carvacrol, o-aminophenol, catechol, resorcinol, napthophenol, thymol, fluoroglucinol or the like, or by storing the aldehyde in the absence of actinic light, as in an opaque container or in a glass container which is non-transmissive to actinic light, or by both adding such a phenolic antioxidant and excluding actinic light. However, the 3,4-dihydro-1,2-pyran-2-carboxaldehyde still increase in viscosity, albeit at a retarded rate, whether or not the above precautions are taken, until, after a number of months, it is completely and irreversibly transformed to an insoluble solid. The autopolymerization of 3,4-dihydro-1,2-pyran-2-carboxaldehyde which occurs in the absence of actinic light and is substantially unaffected by the presence of phenolic antioxidants, such as hydroquinone, appears to be used upon an obscure mechanism which, at the present time, is not well understood. That the mechanism does not involve the intervention of, for example, peroxides, appears to be convincingly shown by the ineffectiveness of hydroquinone and related antioxidants for preventing the autopolymerization which is caused by actinic light. It appears to be quite unlikely that the non-actinically induced autopolymerization involves merely the formation of vinyl-type polymers or of polymers formed via polymerization through the formyl group. It will be noted that the polymeric products of such autopolymerization contain greatly reduced contents of both the olefinic bond and the formyl group, indicating that both of these reactive groups probably are involved in the polymerization reaction.

It will be evident that such non-actinic autopolymerization of 3,4-dihydro-1,2-pyran-2-carboxaldehyde is highly disadvantageous because it precludes economic storage of 3,4-dihydro-1,2-pyran-2-carboxaldehyde for any prolonged periods of time, even though a phenolic antioxidant may have been added to reduce the actinic or peroxide-type of polymerization. It thus has been necessary either to limit the time of storage to an undesirably short time, within which excessive change does not occur, or to encounter the risk of involving serious losses of product due to irreversible conversion to the viscous or even solid material formed under such conditions of storage.

It is a principal object of the present invention to prevent or to substantially preclude the non-actinic autopolymerization of 3,4-dihydro-1,2-pyran-2-carboxaldehyde, which autopolymerization occurs in the presence or the absence of light and is incapable of being effectively prevented by the addition of phenolic antioxidants, such as hydroquinone and related mono-nuclear and di-nuclear phenols. It is a particular object of the invention to provide a stabilized composition of matter essentially comprising 3,4-dihydro-1,2-pyran-2-carboxaldehyde which can be stored alone or in admixture with other materials for long periods of time without the occurrence of undesired polymerization. A method for obtaining such novel compositions of matter is another object of the invention.

It has now been discovered in accordance with the present invention that the gradual change in or autopolymerization of 3,4-dihydro-1,2-pyran-2-carboxaldehyde occuring over prolonged periods of time, particularly in the absence of light, can be prevented or effectively reduced by acidifying 3,4-dihydro-1,2-pyran-2-carboxaldehyde by addition thereto of a small amount of a low-molecular weight acidic substance, such as an acid-reacting material or a material which liberates acid in situ. Very small amounts of such acidic substances are effective. From as little as 0.0001% to as much as 10% by weight of the 3,4-dihydro-1,2-pyran-2-carboxaldehyde can be employed, although even larger or smaller amounts may be used, if desired. In general, it is preferable to employ an amount of the acidic substance within the range of from about 0.001 to about 1% by weight of the 3,4-dihydro-1,2-pyran-2-carboxaldehyde. As an outcome of the invention, samples of the 3,4-dihydro-1,2-pyran-2-carboxaldehyde stabilized by the incorporation therewith of such traces of acidic substances can be stored in the absence of actinic light for periods of time up to many months without significant change, whereas otherwise identical samples containing no acid-reacting material and stored under the same conditions for an equal length of time undergo excessive and detrimental autopolymerization.

For the purposes of the present invention, an acid-reacting material is defined as a material which has an acidic dissociation constant or contains at least one dissociable hydrogen atom having an acidic dissociation constant at least about $1 \times 10^{-7}$ determined in an aqueous medium. Preferred acid-reacting substances are those that have at least one dissociable hydrogen atom or acidic group having an acid dissociation constant of at least about $1 \times 10^{-5}$. It is desirable to employ as the acid-reacting substance or the material which reacts in situ to liberate acid, one which is devoid of reactive groups or atoms which would combine with the 3,4-dihydro-1,2-pyran-2-carboxaldehyde which is to be stabilized. In general, it is preferred to employ acid-reacting materials which are devoid of phenolic hydroxyl groups, that is of hydroxyl groups which are directly linked to an aryl group.

In accordance with the invention, various acid-reacting materials or materials which liberate acid in situ, may be employed to acidify 3,4-dihydro-1,2-pyran-2-carboxaldehyde thereby stabilizing it against non-actinic autopolymerization. One group of acid-reacting substances comprises in particular the inorganic, preferably the strong mineral acids and most desirably the strong non-volatile mineral acids. Illustrative of these are, for example, sulfuric acid, sulfurous acid, arsenic acid, phosphoric acid, the hydrohalogen acids, including hydrochloric acid, hydrobromic acid, and hydroiodic acid, tellurous acid, tungstic acid, and the like. In general it is preferred to employ a non-volatile strong mineral acid, such as phosphoric acid or sulfuric acid. Instead of a mineral acid there may be employed in accordance with the invention any of the various organic acids which have the characteristics hereinbefore and hereinafter described. Illustrative carboxylic acids which may be employed in accordance with the invention include, among others, the aliphatic, preferably saturated, mono-carboxylic acids, such as formic acid, acetic acid, propionic acid, trichloroacetic acid, butyric acid, valeric acid, caproic acid, chloropropionic acid, bromobutyric acid, capryllic acid, capric acid, lactic acid, methoxyethoxyacetic acid, carbethoxypropionic acid, gamma-ethoxybutyric acid, epsilon-diethylaminovaleric acid, glycine hydrochloride, gamma-acetylbutyric acid, beta-butoxypropionic acid, and the like, and homologs and analogs thereof. There also may be employed aromatic carboxylic acids such as benzoic acid, toluic acid, phthalic acid, isophthalic acid, trimesic acid, mellitic acid, nicotinic acid, acrydinic acid, phenylacetic acid, cinnamic acid and the like; as well as non-aromatic cyclic carboxylic acids such as cyclohexanecarboxylic acid, cyclohexaneacetic acid, cyclopentanecarboxylic acid, cyclohexanedicarboxylic acid-1,2, and heterocyclic acids, such as 2-pyrrolecarboxylic acid, quinaldic acid, antipyric acid, cinchoninic acid, furoic acid, dihydropyran-2-carboxylic acid, and homologs and analogs thereof. A further suitable group of organic acids which may be employed advantageously according to the invention comprises the aromatic sulfonic acids, such as p-toluenesulfonic acid, benzenesulfonic acid, p-methoxybenzenesulfonic acid, beta-naphthalenesulfonic acid, 1,5-naphthalenedisulfonic acid, 5-quinolinesulfonic acid, and the like. Sulfonic acids which contain a carboxyl group in addition to the sulfo group are exemplified by o-sulfobenzoic acid, 4-sulfophenylacetic acid, 2-methyl-4-sulfobenzoic acid and 4-sulfo-2-chlorobenzoic acid.

While the invention includes generically the use of any carboxylic acid, which carboxylic acid may contain only one carboxyl group or may contain a plurality of carboxyl groups, it has been found that aliphatic saturated dicarboxylic acids are of particular efficacy for the objects of the invention and that their use as acidic substances in accordance with the invention leads to stabilized 3,4-dihydro-1,2-pyran-2-carboxaldehyde compositions having an optimum degree of stability. Included in this particularly preferred group are acids of the general formula $$HOOC—(CH_2)_x—COOH$$

wherein $x$ represents an integer, preferably one having a value of from 0 to 4, inclusive, and wherein one or more of the hydrogen atoms of the $CH_2$ group or groups may be substituted by oxy or hydrocarbon groups, for example, alkyl. Included in this particularly preferred group of carboxylic acids are oxalic acid, malonic acid, succinic acid, glutaric acid, adipic acid, tartaric acid, pimelic acid, azelaic acid, brassylic acid, alpha, alpha'-dimethyladipic acid, alpha,beta-dimethylglutaric acid, alpha,gamma-diethylglutaric acid, isopropylmalonic acid, propylsuccinic acid, alpha gamma-dihydroxyglutaric acid, alpha,gamma-diethoxysuccinic acid, alpha,delta-dihydroxyadipic acid, dimethyltartaric acid, ethoxysuccinic acid, malic acid, thiomalic acid, beta-chloro-beta-methylmalic acid, phenylsuccinic acid, phenylmalonic acid, methylpropylmalonic acid, and the like and their homologs and analogs. Of these, oxalic acid is preferred.

Generally speaking, the acidic materials which are employed are acid reacting materials which contain at least one dissociable hydrogen atom or acid group having an acid dissociation constant determined in aqueous medium of at least $1 \times 10^{-7}$, and a molecular weight not over about 450, and substances which generate in situ an acid-reacting material containing at least one dissociable hydrogen atom or acid group having an acid dissociation constant determined in aqueous medium of at least $1 \times 10^{-7}$ and a molecular weight not over about 450. It is preferred to employ acid-reacting materials that contain a minimum of acid groups, generally not over three, per molecule, at least one of said groups having an acid-dissociation constant of at least $1 \times 10^{-5}$. Particularly efficacious acid-reacting materials are those having molecular weights up to about 200. Optimum results have been obtained with organic acids which are devoid of phenolic hydroxyl groups, or hydroxyl groups directly linked to an aryl group.

The acidifying or acid-reacting substances may be added to or mixed with the 3,4-dihydro-1,2-pyran-2-carboxaldehyde in any convenient manner and at any suitable time prior to or during purification of the aldehyde or prior to or during storage. It is particularly efficacious to mix the acid-reacting material in the desired amounts with the 3,4-dihydro-1,2-pyran-2-carboxaldehyde shortly after purification of the aldehyde since in this manner the product to be stabilized will have been substantially freed of any polymeric materials that may have previously formed and the subsequent formation of undesired polymers will be substantially precluded. The acid-reacting substance or material which reacts in situ to generate acid may be added per se or suspended or dissolved in a suitable media, such as an organic solvent. The presence of water in the stabilized composition should be substantially precluded since 3,4-dihydro-1,2-pyran-2-carboxaldehyde has a great affinity for water and the presence of even minor quantities of water tends to markedly accelerate the formation of polymers and other products. For ordinary purposes the 3,4-dihydro-1,2-pyran-2-carboxaldehyde will be stored in the substantially pure state. Solutions of 3,4-dihydro-1,2-pyran-2-carboxaldehyde in suitable inert organic solvents may be stabilized in accordance with the invention. The invention embraces the stabilization of compositions comprising or consisting of 3,4-dihydro-1,2-pyran-2-carboxaldehyde wherein it is desired to retain the heterocyclic aldehyde in monomeric form free of polymers for prolonged periods of time. Following the addition or incorporation of the acid-reacting substances, the 3,4-dihydro-1,2-pyran-2-carboxaldehyde may be retained or stored at any temperature consistent with the ordinary requirements of storage and transportation. The aldehyde preferably is stored without access thereto of actinic light, as in an opaque container, a glass container that is non-transmissive to actinic light, or in a locality from which light is excluded. Independently of the practice of the method of the present invention, suitable phenolic antioxidants or phenolic polymerization inhibitors, such as hydroquinone and like mono-, di- and trihydric phenols of the character referred to hereinbefore, may be incorporated with the 3,4-dihydro-1,2-pyran-2-carboxaldehyde to reduce or to prevent the polymerization which is brought about by exposure to actinic light, perhaps induced by peroxides or peroxide-simulating compounds.

To illustrate the effectiveness of the method of the present invention and to present representative examples of stabilized novel compounds provided thereby, the following examples are given. It is to be understood that the examples are presented for the purpose of illustrating certain of the specific embodiments of the principles of the invention and that they are not intended to be in the nature of limitations upon the invention as it is more broadly defined in the hereto appended claims.

In the following examples the experiments were conduced by taking portions of freshly distilled samples of 3,4-dihydro-1,2-pyran-2-carboxaldehyde and mixing therewith the desired amount of the acid-reacting substance to be tested. Each sample then was stored at a constant temperature in stoppered glass bottles which were opaque to actinic light. In this manner possible interference resulting from actinic autopolymerization was avoided and the selective stabilizing action of the materials incorporated with the 3,4-dihydro-1,2-pyran-2-carboxaldehyde was demonstrated.

*Example I*

To illustrate the autopolymerization of 3,4-dihydro-1,2-pyran-2-carboxaldehyde that occurs in the absence of actinic light, a sample of 3,4-dihydro-1,2-pyran-2-carboxaldehyde was purified by distillation under reduced pressure through an efficient fractionating column and a narrow-boiling fraction of pure product separated. The purified aldehyde had a refractive index $(n_D^{20})$ of 1.4637, a carbonyl value 97% of theory, and a double bond titre 97.5% of theory, determined by appropriate analytical methods.

A sample of the freshly purified compound was stored in a closed brown glass bottle at 110° F. During 15 days' storage under these conditions, the refractive index of the unstabilized material increased by $109 \times 10^{-4}$, during 27 days' storage by $187 \times 10^{-4}$ and after 35 days' storage the refractive index had increased by $231 \times 10^{-4}$. At this time the carbonyl content of the sample was found to have decreased to 42% of the original carbonyl content. When stored at room temperature but under conditions otherwise the same, the refractive index of a further portion of the purified 3,4-dihydro-1,2-pyran-2-carboxaldehyde increased in 27 days by $235 \times 10^{-4}$ and the carbonyl content decreased to 30% of theory.

At the same time, there was mixed with a further portion of the freshly purified 3,4-dihydro-1,2-pyran-2-carboxaldehyde employed above, 0.02% by weight of oxalic acid and the stabilized sample was stored as above at 110° F. During 35 days' storage under these conditions the refractive index increased only $30 \times 10^{-4}$ units. At the end of this time the stabilized sample was found to have a carbonyl content 95% of theory, compared to the original 97% of theory. After 124 days' storage the carbonyl content of the stabilized sample was 93% of theory and the sample was a fluid liquid, whereas an unstabilized sample stored under the same conditions for the same time was converted to a hard solid.

*Example II*

A freshly purified sample of 3,4-dihydro-1,2-pyran-2-carboxaldehyde having a refractive index ($n_D^{20}$) of 1.4633 and a carbonyl value 98% of theory, was stabilized by the addition of 0.005% by weight of oxalic acid and the stabilized composition was stored in a closed brown bottle at 110° F. After 27 days' storage it was found that the refractive index had increased only by $23 \times 10^{-4}$ and that the carbonyl content was 96% of the original value. Under the same conditions, a further sample of the same freshly purified product which was stored without the addition of a stabilizer had a carbonyl content after 27 days' storage only 43% of the initial value and its refractive index had increased by $150 \times 10^{-4}$ units.

A still further portion of the same freshly purified material was stabilized by the addition of 0.02% by weight of oxalic acid and stored under the same conditions employed with the other two samples. After 27 days of storage, the refractive index of this sample increased by only $10 \times 10^{-4}$ units and the carbonyl content was 97% of theory compared to the initial 98% of the theory.

Example III

To separate samples of freshly purified 3,4-dihydro-1,2-pyran-2-carboxaldehyde having a refractive index ($n_D^{20}$) of 1.4633 and a carbonyl content 98% of theory there were added the indicated amounts of the materials listed in the tables below. The stabilized samples were stored at 110° F. in stoppered brown glass bottles, the refractive index of each sample being measured at the indicated times to determine the extent of change, if any, during the storage. At the conclusion of the experiments the carbonyl contents (as percent of theory) of the samples were analytically determined. The results shown in the table were obtained. In the tables, the columns headed "$\Delta n \times 10^4$" show the increase in the refractive index at the indicated times and the columns headed "% C=O" show the analytically determined carbonyl content of the sample at the indicated times, expressed as percent of theory for pure 3,4-dihydro-1,2-pyran-2-carboxaldehyde.

The claimed invention is:

1. As a new composition of matter, 3,4-dihydro-1,2-pyran-2-carboxaldehyde containing from about 0.001% to about 1% by weight of oxalic acid dissolved therein, said composition being stabilized against non-actinic autopolymerization.

2. As a new composition of matter, 3,4-dihydro-1,2-pyran-2-carboxaldehyde containing from about 0.001% to about 1% by weight of a saturated aliphatic dicarboxylic acid dissolved therein, said composition being stabilized against non-actinic autopolymerization.

3. As a new composition of matter, 3,4-dihydro-1,2-pyran-2-carboxaldehyde containing from about 0.001% to about 1% by weight of sulfanilic acid dissolved therein, said composition being stabilized against non-actinic autopolymerization.

4. As a new composition of matter, 3,4-dihydro-1,2-pyran-2-carboxaldehyde containing from about 0.001% to about 1% by weight of an aromatic sulfonic acid dissolved therein, said composition being stabilized against non-actinic autopolymerization.

5. As a new composition of matter, 3,4-dihydro-1,2-pyran-2-carboxaldehyde containing from about 0.001% to about 1% by weight of a lower saturated aliphatic monocarboxylic acid dissolved therein, said composition being stabilized against non-actinic polymerization.

6. As a new composition of matter, 3,4-dihydro-1,2-pyran-2-carboxaldehyde containing from about 0.001% to about 10% by weight of a carboxylic acid dissolved therein, said composition being stabilized against non-actinic autopolymerization.

7. As a new composition of matter, 3,4-dihydro-1,2-pyran-2-carboxaldehyde containing from about 0.0001% to about 10% by weight of a sulfonic acid dissolved therein, said composition being stabilized against non-actinic autopolymerization.

8. As a new composition of matter, 3,4-dihydro-1,2-pyran-2-carboxaldehyde containing dissolved therein from about 0.0001% to about 10%

*Table I*

| Polymerization Inhibitor | Amount, Per Cent by Weight | Time, in Days | | | | | | |
|---|---|---|---|---|---|---|---|---|
| | | 7 | 20 | 27 | | 35 | |
| | | $\Delta n \times 10^4$ | $\Delta n \times 10^4$ | $\Delta n \times 10^4$ | Per Cent C=O | $\Delta n \times 10^4$ | Per Cent C=O |
| None | | 79 | 172 | 239 | 30 | 251 | 22 |
| Formic Acid | 0.02 | 14 | 32 | 53 | 87 | 94 | 75 |
| Trichloroacetic Acid | 0.02 | 27 | 42 | 55 | 86 | 78 | 82 |

*Table II*

| Polymerization Inhibitor | Amount, Per Cent by Weight | Time, in Days | | | | | |
|---|---|---|---|---|---|---|---|
| | | 15 | | 35 | | 123 | |
| | | $\Delta n \times 10^4$ | Per Cent C=O | $\Delta n \times 10^4$ | Per Cent C=O | $\Delta n \times 10^4$ | Per Cent C=O |
| None | | 113 | 66 | 312 | 15 | had solidified | |
| Phthalic Anhydride | 0.02 | 10 | 97 | 29 | 93 | 125 | 64 |
| Succinic Acid | 0.02 | 12 | 96 | 35 | 92 | 147 | 58 |
| Tartaric Acid | 0.02 | 13 | 96 | 33 | 92 | 152 | 57 |
| Sulfanilic Acid | 0.02 | 4 | 98 | 10 | 97 | 25 | 94 |
| Anthranilic Acid | 0.10 | 77 | | | | | |
| Salicyclic Acid | 0.10 | 82 | | | | | | by weight of an acid-reacting substance having an acidic dissociation constant of at least about $1 \times 10^{-7}$, said composition being stabilized against non-actinic autopolymerization.

9. As a new composition of matter, 3,4-dihydro-1,2-pyran-2-carboxaldehyde having dissolved therein a minute amount of an acidic substance having an acidic dissociation constant of at least about $1 \times 10^{-7}$, said composition being stabilized against non-actinic autopolymerization.

10. The method of inhibiting the non-actinic autopolymerization of 3,4-dihydro-1,2-pyran-2-carboxaldehyde, which comprises incorporating therewith from about 0.001% to about 1% by weight of oxalic acid.

11. The method of stabilizing 3,4-dihydro-1,2-pyran-2-carboxaldehyde against non-actinic autopolymerization, which comprises incorporating therewith from about 0.0001% to about 10% by weight of a saturated aliphatic dicarboxylic acid.

12. The method of stabilizing 3,4-dihydro-1,2-pyran-2-carboxaldehyde, which comprises adding thereto from about 0.001% to about 10% by weight of a lower saturated aliphatic monocarboxylic acid.

13. The method of inhibiting the autopolymerization of 3,4-dihydro-1,2-pyran-2-carboxaldehyde, which comprises incorporating therewith from about 0.001% to about 1% by weight of sulfanilic acid.

14. The method of stabilizing 3,4-dihydro-1,2-pyran-2-carboxaldehyde which comprises incorporating therewith from about 0.0001% to about 10% by weight of an aromatic sulfonic acid.

15. The method of inhibiting the non-actinic autopolymerization of 3,4-dihydro-1,2-pyran-2-carboxaldehyde, which comprises acidifying said 3,4-dihydro-1,2-pyran-2-carboxaldehyde by incorporation therewith of an acidic material having an acidic dissociation constant of at least about $1 \times 10^{-7}$ and thereafter maintaining said 3,4-dihydro-1,2-pyran-2-carboxaldehyde during subsequent storage inaccessible to actinic light.

16. The method of storing 3,4-dihydro-1,2-pyran-2-carboxaldehyde for relatively prolonged periods of time under conditions normally conducive to autopolymerization of 3,4-dihydro-1,2-pyran-2-carboxaldehyde, which comprises incorporating with said 3,4-dihydro-1,2-pyran-2-carboxaldehyde a minute amount of an acidifying substance having a dissociation constant of at least $1 \times 10^{-7}$.

EUGENE B. FOUNTAIN.
WALTER H. SHARP.

REFERENCES CITED

The following references are of record in the file of this patent:

UNITED STATES PATENTS

| Number | Name | Date |
|---|---|---|
| 2,479,283 | Whetstone | Aug. 16, 1949 |
| 2,480,990 | Whetstone | Sept. 6, 1949 |